United States Patent

[11] 3,607,417

| [72] | Inventors | Wayne A. McRae<br>Lexington, Mass.;<br>John O'M. Bockris, Philadelphia, Pa. |
|---|---|---|
| [21] | Appl. No. | 687,607 |
| [22] | Filed | Dec. 4, 1967 |
| [45] | Patented | Sept. 21, 1971 |
| [73] | Assignee | Ionics, Incorporated<br>Watertown, Mass. |

[54] BATTERY CELL
9 Claims, 3 Drawing Figs.

[52] U.S. Cl. ........................................................ 136/86,
136/146, 136/153, 136/154
[51] Int. Cl. ........................................................ H01m 29/04
[50] Field of Search ........................................ 136/86, 86
A, 145, 6, 146, 153, 154; 204/295, 282

[56] References Cited
UNITED STATES PATENTS

| 1,942,668 | 1/1934 | Smith | 136/145 |
|---|---|---|---|
| 3,021,379 | 2/1962 | Jackel | 136/145 |
| 3,159,507 | 12/1964 | Abbe et al. | 136/145 |
| 3,214,296 | 10/1965 | Smatko | 136/86 A X |
| 3,293,079 | 12/1966 | Brodd | 136/86 |
| 3,350,233 | 10/1967 | Plust et al. | 136/86 A |
| 3,404,035 | 10/1968 | Kummer et al. | 136/6 |
| 3,404,036 | 10/1968 | Kummer et al. | 136/6 |
| 3,425,871 | 2/1969 | Berger | 136/145 X |

*Primary Examiner*—Carl D. Quarforth
*Assistant Examiner*—Harvey E. Behrend
*Attorneys*—Aaron Tushin and Norman E. Saliba

ABSTRACT: A primary and/or secondary battery cell is disclosed in which the high electrochemical capacity and high voltage obtainable from the alkali metal-oxygen system is achieved without the inherent risk of the explosively violent reaction of the alkali metal with the aqueous catholyte of the cell by interposing an ion-permeable but water-impermeable substantially insoluble laminar membrane-diaphragm between said metal and said aqueous electrolyte. The laminar membrane-diaphragm comprises a supporting microporous material such as, for example, a ceramic material which is fused or otherwise attached to a thin nonporous substantially catholyte insoluble alkali metal composition which is permeable to the alkali metal ions.

PATENTED SEP 21 1971 3,607,417

INVENTORS
WAYNE A. MC RAE
JOHN O'M. BOCKRIS
BY,
Norman E Saliba
ATTORNEY

BATTERY CELL

This invention relates to a primary or secondary battery (electromotive force cell) having an alkali metal anode which is separated from the catholyte of the battery by a membrane, the latter being permeable to alkali metal cations but impermeable to water or other solvent molecules. More specifically, the alkali metal anode, preferably lithium, although sodium and potassium may also be used, is separated from a metal hydroxide electrolyte (catholyte) of the battery by a barrier comprising a microporous ceramic layer as a supporting structure or diaphragm, laminated to a thin skin or membrane of a substantially insoluble metal specific composition. This membrane-diaphragm effectively separates the anode from the aqueous, substantially ionized, alkali metal compound electrolyte, which latter is simultaneously in contact with a catalytic cathode and an oxidant, such as oxygen, air, chlorine, bromine, fluorine or liquid sulfur. The substantially ionized, alkali metal compound is preferably a reaction product of the alkali metal and the oxidant.

Prior art commercial batteries are well known to have many disadvantages such as low voltage and low-energy density. Alkali metal-oxygen batteries have been proposed in the prior art as overcoming such disadvantages. They have, however, all faced the same problem, that is, the violent and frequently explosive reactivity of the alkali metals with aqueous electrolytes, particularly at the elevated temperatures which generally prevail in operating cells. To overcome this specific problem, E. Yeager disclosed in *Fuel Cells* (ed. W. Mitchell Jr., Academic Press, New York, 1963, pages 300 to 328; also in the Kirk-Othmer Encyclopedia of Chemical Technology, second edition, volume 3, pages 152 and 153) the use of a flowing alkali metal amalgam anode. Such dilute amalgams have a considerably lower electrode potential and a much higher hydrogen overvoltage than pure alkali metal and therefore react only slowly with aqueous electrolytes. The alkali metal amalgam-oxygen cell necessarily has a considerably lower voltage than the alkali metal-oxygen cell but this sacrifice is accepted in order to get a cell which can be controlled and which is safe. The Yeager cell also suffers from having a large recirculating stream of expensive and toxic hot liquid mercury and from the necessary additional external amalgamator which increases the complexity, size, weight and cost of the apparatus. There are also serious problems in keeping the steel anode clean so that the falling mercury will adhere. Additionally there is also some emulsification of mercury in the electrolyte and of water in the mercury since there is no positive separation between the anode and the electrolyte. In principle the Yeager cell may be operated as a secondary (regenerable) battery though in practice this has not been feasible since the alkali metal does not crystallize out from the amalgam at some heat sink but instead solid, dilute amalgams form which require large inventories of mercury. The formation of such amalgams is difficult to control and generally the amalgam piping is completely plugged with solid amalgam during regeneration.

Crowley et al. (U.S. Pat. No. 2,921,110) attempted to retain the high voltage possible with alkali metal-oxygen couples by designing a dynamic reserve battery system in which the reactants are added only when current is desired and in proportion to the current demand. In any case it is necessary to use special electrolytes such as molten sodium hydroxide, molten sodium hydroxide monohydrate, or liquid ammonia to reduce the violence of the reactivity of the alkali metal with the electrolyte. These electrolytes are disadvantageous owing to their poor electrical conductivity and the difficulty of maintaining them. Thus the maximum conductivity of sodium hydroxide is found in aqueous solutions having about 15 percent by weight of sodium hydroxide (which are, however, highly reactive with sodium metal) whereas a saturated solution of aqueous sodium hydroxide monohydrate (which is less reactive with sodium metal) has about 63 percent by weight of sodium hydroxide and is a comparatively poor conductor. Molten sodium hydroxide monohydrate is an even poorer conductor. Thus at reasonable current drains the Crowley cell is able to obtain only about 1.5 volts, that is, essentially the same as obtained in the amalgam cells, owing to the high electrical resistivity in the cell. Additionally the maximum Faradaic current efficiencies obtained are less than 85 percent, with the remaining alkali metal forming hydrogen gas. At the elevated temperatures used, this gas is highly reactive with the oxidants used (oxygen or chlorine) particularly at the catalytic oxidizing (positive) electrode. Under these conditions the hydrogen resulting from the nonproductive reaction of alkali metal can result in fires or explosions at the cathode. Further, the cell cannot be readily regulated, started up or shut down owing to the holdup of alkali metal in the system. For example, if it is decided to shut down the cell, it is necessary to keep an electrical load on the cell until all of the alkali metal has formed hydrogen gas. It is also necessary to have a rapid flow of electrolyte through the cell to carry out the hydrogen gas resulting from noncoulombic processes and to maintain cell temperature by carrying away excess heat formed at heavy currents and by bringing in heat at light currents. The Crowley system is solely a primary system and cannot be regenerated electrolytically unless the electrolyte is molten sodium hydroxide absolutely free of water and then only at about 50 percent current efficiency. If any water is present, then hydrogen and oxygen alone will be given off until all of the water of the caustic has been decomposed. Both sodium and hydrogen will then be deposited at the cathode and oxygen at the anode (50 percent current efficiency). Great care is required to prevent an explosive recombination of these elements. The regeneration must be carried out in the range of 310° C. to 320° C. Above this temperature range, the rate of recombination of the sodium metal is about equal to that of the decomposition of the hydroxide and no metal is produced. At any rate, the practical problems of collecting the sodium metal, rejecting the hydrogen gas without allowing it to combine with the oxygen and of collecting the oxygen gas without permitting it to combine with the hydrogen, are extremely difficult. When liquid ammonia is used as the electrolyte, the solubility of alkali metal in the ammonia results in a low current efficiency both on the charge and discharge cycle because of the oxidation of sodium at the oxygen electrode.

The present invention avoids all the difficulties inherent in the prior art by having a positive separation of the alkali metal and the electrolyte particularly the catholyte. This separation is effected by an interceding laminar membrane-diaphragm or barrier which will be fully described hereinafter, and which provides for the transport of alkali metal ions without water. The membrane-diaphragm provides positive separation between the metal and the protic solvents normally used as catholytes.

It is therefore an object of the present invention to provide a primary or storage battery which utilizes the free energy of the reaction between an alkali metal, preferably lithium, and an oxidizing agent, preferably oxygen, for the formation of the alkali metal oxide or hydroxide.

A further object of this invention is to provide a secondary or rechargeable alkali metal battery cell in which an extraordinary high-energy conversion efficiency with high voltage is obtained for instant use.

A further object of this invention is to provide an alkali metal primary or secondary rechargeable cell wherein there is no physical contact of the alkali metal with a liquid protic electrolyte whereby the feed control of the alkali metal or the oxidant is not required since the reaction ceases instantly when the current is interrupted.

Another object of the invention is to provide a secondary cell which is extremely simple and wherein no deleterious gaseous byproduct, such as hydrogen, is generated during use, storage or recharge.

Another object of this invention is to provide laminar membrane-diaphragm separating the metal anode from the catholyte of the cell which membrane is resistant to high temperatures and effective for metal ion passage but resistant to passage of water and other protic liquids.

Other objects will become apparent from the disclosure as hereinafter set forth.

The present disclosure as a specific embodiment is hereinafter described as directed to a $Li/O_2$ battery cell but it should be clearly understood that other alkali metal or alkali metal eutectic battery cells are contemplated and included in the scope of the invention. A $Li/O_2$ battery should theoretically have a voltage of about 3.3 volts compared to about 2.2 volts for the well-known lead acid battery. In addition, Lithium(Li) has an electrochemical equivalent of about 1,750 amp-hours per pound while the lead acid battery has less than 60 amp-hours per pound. This is clearly an enormously important difference with respect, for example, to its application to electrically powered vehicles. It will be apparent that the $Li/O_2$ battery cell is the preferred one but all alkali metal couples have advantageous application in the present cell. Such couples include $Na/O_2$, $K/O_2$, $NaK/O_2$, $Na/S$(liquid), $Li/S$(liquid), $K/S$(liquid), $NaK/S$(liquid), $Na/Cl_2$, $K/Cl_2$, $Li/Cl_2$, $Na/Br_2$, $K/Br_2$ and the like.

The invention will now be described in detail in conjunction with the attached drawings in which.

Figure 1:
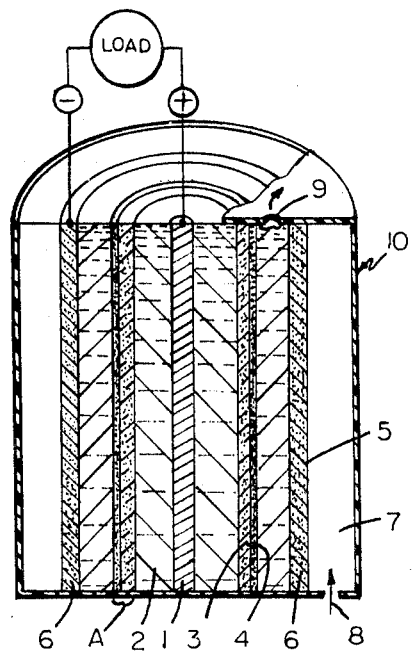
FIG. 1 is a diagrammatic representation of the cell in tubular or cylinder form in accordance with the present invention.

The specific embodiment of the secondary battery cell described with the structure shown in the drawings is a regenerative lithium-oxygen cell. It should be understood, however, that this cell is disclosed by way of illustration and not by way of limitation and may be of a topologically equivalent physical form other than that illustrated.

Referring now to FIG. 1, the numeral 10 designates a tubular cell in the center compartment 2 of which is contained a liquid lithium metal with a fixed metal bar such as iron as the anode conducting rod 1. The lithium is preferably in the liquid state but may be in the form of an amalgam or dissolved in liquid ammonia (not shown). It may also be in a solid state provided a nonaqueous electrolyte is used in the lithium electrode compartment 2. Such a suitable electrolyte may, for example, be ethylene carbonate, dimethyl formamide, dimethyl sulfoxide etc. with lithium hexafluorophosphate, lithium tetrafluoroborate and the like as current carriers, in which case lithium ions pass through an enclosing laminated membrane A in an anhydrous state without endosmotic water. The lithium enclosing laminar barrier A consists of an inert diaphragm support tube 3, such as porous ceramic which may be in contact with the lithium metal, bonded to a liquid impervious thin membrane or skin 4 of a substantially insoluble lithium compound, through which the lithium metal ions are capable of passing therethrough into electrolyte (catholyte) chamber 5 without endosmotic water. The electrolyte chamber, is defined by the laminar membrane-diaphragm, A and the spaced microporous catalytic cathode electrode 6, the latter being enclosed on its outer side by oxygen chamber 7. Cathode electrode 6 is often called the air electrode and may be made of such materials as graphite, lithiated nickel oxide, silver oxide, copper oxide etc. The oxygen or air compartment 7 is provided with an inlet 8 for entrance of oxygen containing gas under controlled pressure means (not shown) with a gas release valve 9 in the electrolyte chamber 5 for removal of excess gas.

Membrane-diaphragm A is an essential feature of the described cell and consists of a laminar structure having a thin nonporous layer 4 of a substantially insoluble alkali metal cation specific composition and a microporous supporting structure 3 attached thereto. Such ion specific compositions are well known, per se, and may be exemplified, for example, by the higher molecular weight insoluble lithium soaps, e.g. the myristate, palmitate, stearate, oleate, elaidate, arachidate, behenate, cetoleate, eruciate, lignocerate, cerotate, montanate and/or melissate; alkalized metal ceramics such as the lithiated oxides of zirconium, titanium, thorium, tungsten, niobium tantalum or uranium and the lithiated rare earth oxides (e.g. lithiated ceria); glasses such as the alkali zirconium silicates, alkali titanium silicates; mixed oxides of Group IV of the Periodic (Mendeleev) Table with those of Groups V and VI for example zirconium, titanium, tin and thorium oxides with the oxides of phosphorous, arsenic, molybdenum, and tungsten; or the alumino-silicates such as analcidite, leucite, chabazite, heulandite, lithium natrolite harmotome, montmorillonite, glauconite and the composition comprising measured in mole percent 15% $Li_2O$ — 25% $Al_2O_3$ — 60% $SiO_2$ (''Ion-Selective Electrodes'' by Dr. G. A. Rechnitz, State University of New York at Buffalo, C&EN feature, June 12, 1967) Pages 146–158. Other useful compositions measured in mole percent include the alkali metal phosphovanadates e.g. $83V_2O_5$–$10P_2O_5$–$6.5Na_2O$ and $83V_2O_5$–$10P_2O_5$–$6.5Li_2O$ (J. D. Mackenzie, Modern Aspects of the Vitreous State, Part 3, Butterworths, Inc., Washington, D.C. 1964, pp. 126–148; cf. Encyclopedia of Chemical Technology, Second Edition Vol. 10, Interscience 1966 pg. 589); also the naturally occurring lithium minerals lepidolite, spodumene, petalite, amblygonite, lithium tourmaline, triphylite-lithiophilite, hiddenite, kunzite, or eucryptite; or the lithium glazes e.g. lithium cobaltite, lithium manganite or lithium zirconate. It is contemplated that the skin, membrane or film have a thickness of less than 10 microns and preferably about 0.1 microns. The microporous supporting structure has a thickness greater than 10 microns and preferably about 1,000 microns. Such a membrane-diaphragm structure may be prepared by forming a laminar structure of, for example, a borosilicate glass and a skin of lithium glass wherein the boric acid is leached out with acid in the known manner. This results in the formation of the desired laminar structure of microporous support and active skin. The two layer structure may also be prepared by doctoring a melt of lithium glass onto a preformed sheet of borosilicate. Alternatively, a sheet of borosilicate glass, either before or after leaching, may be coated with finely divided lithium glass which is then fused. Another method is to fuse the surface of leached borosilicate glass into a Vycor skin and while still hot to contact the skin with a melt of lithium carbonate and aluminum oxide or of spodumene ($LiAl(Si_2O_6)$). It is essential that this structure be laminar in character, the relatively thick microporous layer providing mechanical strength and the relatively thin, nonporous, alkali-metal-ion-conducting layer providing ion selectivity.

By way of other alternates the microporous support may be a ceramic such as fused beryllia, magnesia, zirconia, lanthana, scandia, yttria, ceria, titania, thoria, rare earth oxides or the like which has been coated on one surface with a higher molecular weight lithium soap with or without added high boiling hydrocarbons; or one surface of such a microporous ceramic support may be fused to prepare a nonporous skin which is then alkalized, e.g. by firing with lithium carbonate, oxide, cobaltite, manganite or zirconate or with a frit prepared from the naturally occurring lithium minerals such as lepidolite, spodumene, petalite, amblygonite, lithium tourmaline, triphylite-lithiophilite, hiddenite, kunzite, or eucryptite. Alternatively the skin may consist of a bonded agglomerate of one of the above alkali-metal-ion-conducting composition. Suitable binders include polymers such as polytetrafluoroethylene or polypropylene or ceramics such as beryllia, magnesia, zirconia, ceria, thoria or the rare earth oxides. Such binders are preferably formed *in situ* from alkali and the soluble salt of the metal. It is generally desirable to saturate the alkaline catholyte with the alkali-metal-ion-conducting composition, for example by slurrying some of the latter in a finely divided state with the catholyte at the expected operating temperature. This permits the use of films which would not otherwise have a useful life.

In the preferred embodiment of the disclosed cell the electrolyte in compartment 5 is aqueous lithium hydroxide and the air electrode 6 is one well known in the art and used in alkaline fuel cells such as microporous, catalytic lithiated nickel oxide supported on nickel, or graphite or silver oxide on silver, or graphite etc. The air is decarbonated, and the cathode 6 is waterproofed e.g. with a fluocarbon. The air is preferably but not necessarily in contact with the electrode on one side while the electrolyte contacts the other side of the electrode.

The chemical reactions involved in the operation of the cell described above at discharge under a load may be depicted as follows:

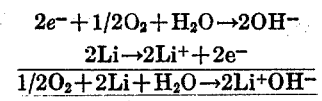

The reactions are reversible resulting in a rechargeable battery cell. During the discharge of the battery, oxygen contacting the catalytic porous cathode 6 combines with water of the electrolyte in chamber 5 forming $OH^1$, while simultaneously the lithium (or other alkali) metal 2 in the central tube is converted to $Li^+$ (respectively alkali metal cation) which is supplied through porous supporting diaphragm 3 and through the thin skin of cation transferable lithium (or other alkali metal) composition 4 forming the ionic partner for said $OH^1$ in the electrolyte compartment 5 as represented in the chemical equations noted hereinabove. During recharging, the $Li^+$ is discharged onto the lithium metal 2 while oxygen gas is evolved into the ambient from electrolyte compartment 5 whereby a particularly high-energy density per pound of cell is obtained.

Figure 2:
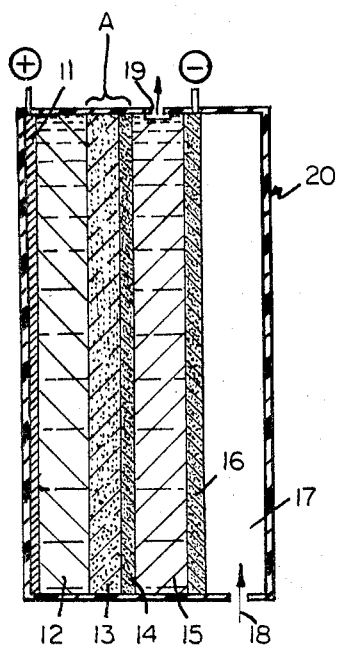
FIG. 2 is a diagrammatic representation of the cell of FIG. 1 in generally rectangular form.

Referring now to FIG. 2 of the drawings, the cell depicted therein is chemically and topologically similar to that of FIG. 1 except it is nontubular in form. The anode conducting rod 11 is adjacent to one end of cell 20 with liquid lithium 12 enclosed by spaced laminar membrane-diaphragm A consisting of porous ceramic support 13 attached to the thin skin silicate or other nonporous cation permeable, water impermeable material 14. The aqueous electrolyte in chamber 15 is enclosed by said membrane-diaphragm A and air electrode 16. Compartment 17, is provided with air inlet 18 with the outlet 19 provided for at the top of electrolyte chamber 15. It will be apparent that cells of FIGS. 1 and 2 operate in the same manner.

Figure 3:
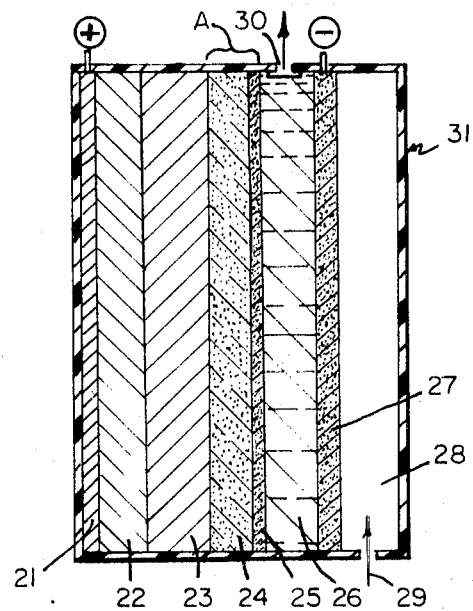
FIG. 3 is a diagrammatic representation of a modified cell of the present invention.

In FIG. 3 the cell 31 is a modification of that of FIG. 2 wherein the lithium metal 22 is in the solid state, thus requiring the inclusion of a nonaqueous electrolyte 23 adjacent thereto. The anode electrode 21 is adjacent to the end of the cell wall in direct contact with the lithium metal 22, whereas the air compartment 28 is situated at the other end of the cell. Porous cathode electrode 27 is spaced from the laminar membrane-diaphragm A, the latter consisting of porous ceramic diaphragm 24 fused to thin skin cation permeable, water impermeable membrane 25. It is apparent that the laminar membrane-diaphragm A effectively separates the nonaqueous current carrying electrolyte 23 from aqueous LiOH electrolyte 26, but nevertheless allows $Li^+$ to pass through said laminar membrane-diaphragm A into said aqueous electrolyte 26. Pressure controlled air inlet 29 and outlet 30 are provided for in compartments 28 and 26, respectively. The nonaqueous electrolyte 23 may be, for example, dimethyl formamide or ethylene carbonate containing lithium tetrafluoroborate, lithium hexafluorophosphate or the like.

The cell of the invention disclosed herein has the high voltage obtainable from the alkali-metal-oxygen system and is electrically regenerable as a secondary cell though it can be used as a primary cell. Since there is no direct contact of the alkali metal 22 with the aqueous liquid electrolyte 26 there is no reason to control the feed of oxygen and metal; when the current is interrupted the reaction ceases instantly. Further, the reaction proceeds only to the extent required by the current. The laminar membrane-diaphragm A has a low electrolytic resistance since the active portion of the barrier membrane is very thin (about $10^{15}$ cm.) and, although it specific resistance (ohm-cm.) is high, its areal resistance (ohm-cm.$^2$) is quite low. The present cell is very simple in construction; it does not require recirculating mercury or electrolyte streams, and no hydrogen gas is generated during use, storage or recharge. Liquid lithium metal (melting point—186° C.) is maintained in its liquid state by the inherent electrical resistance of the cell (FIGS. 1 and 2) during operation, and the walls of the cell may be properly insulated or heat applied thereto by an outside source (not shown) when found necessary. In like manner a heat sink (not shown) may be applied to the outside walls of the cell when found necessary to maintain the lithium metal in its solid state (FIG. 3).

We claim:
1. An electromotive force cell comprising an alkali metal anode, a spaced porous catalytic cathode and a laminated membrane-diaphragm structure between said electrodes, said structure comprising a porous diaphragm support with at least one surface of said support having attached thereto an inorganic, thin skin or membrane of a nonporous, substantially catholyte insoluble, water-impermeable, electrolytically conducting alkali metal glass composition permeable to alkali metal cations but nonselective to anions, means for passing a gaseous oxidizing agent to said porous cathode and into effective proximity with an aqueous liquid catholyte, said catholyte comprising substantially the ionized product resulting from the reaction of said alkali metal and said oxidizing agent with said membrane-diaphragm structure separating the liquid catholyte from the alkali metal anode.

2. The cell according to claim 1 wherein the alkali metal is selected from the group consisting of lithium and lithium amalgam.

3. The cell according to claim 1 wherein the alkali metal anode is in molten liquid state and said catholyte comprises the hydroxide of said alkali metal.

4. The cell according to claim 1 wherein the oxidizing agent is oxygen.

5. The cell according to claim 1 wherein the oxidizing agent is liquid sulfur and the catholyte comprises an alkali metal sulfide.

6. The cell according to claim 1 wherein the alkali metal anode is in the solid state and in contact with a nonaqueous liquid selected from the group consisting of ethylene carbonate, dimethyl acetamide, tetramethylene sulfone, dimethyl formamide and dimethyl sulfoxide, said nonaqueous liquid containing a current conducting species therein selected from the group consisting of the quaternary ammonium and alkali metal salts of hexafluorophosphate, tetrafluoroborate, hexafluoroarsenate, chloride and bromide.

7. The cell according to claim 1 wherein the electrically conducting membrane composition comprises a major amount of an oxide selected from the group consisting of the oxides of silicon, titanium, zirconium, cerium and thorium with minor amount of alkali metal oxides and an oxide selected from the group consisting of aluminum, scandium, yttrium, lanthanum and didymium.

8. The cell according to claim 1 wherein the alkali metal electrode is lithium and the composition of the skin or membrane comprises measured in mole percent of about 15% $Li_2O$—25% $Al_2O_3$—60% $SiO_2$.

9. The cell according to claim 1 wherein the composition of the membrane skin is an alkali metal phosphovanadate glass selected from the group consisting of about $83V_2O_5$—$10P_2O_5$—$6.5Na_2O$ and $83V_2O_5$—$10P_2O_5$—$6.5Li_2O$ measured in mole percent.